United States Patent [19]

Rutishauser

[11] 4,193,527

[45] Mar. 18, 1980

[54] TRANSPORT DEVICE FOR A BORDER-PERFORATED STRIP-LIKE WEB OF DATA RECORDING MATERIAL

[76] Inventor: Albert Rutishauser, Rutihofstrasse 40, 8713 Verikon, Switzerland

[21] Appl. No.: 893,536

[22] Filed: Apr. 4, 1978

[30] Foreign Application Priority Data

Apr. 7, 1977 [CH] Switzerland .......................... 4415/77

[51] Int. Cl.$^2$ .................................................. G03B 1/30

[52] U.S. Cl. ....................................................... 226/74

[58] Field of Search ............................. 226/74, 75, 87; 400/616, 616.1, 616.2, 616.3

[56] References Cited

U.S. PATENT DOCUMENTS 3,606,122 9/1971 Brewster et al. ...................... 226/74

3,825,162 7/1974 Hubbard ................................ 226/74

OTHER PUBLICATIONS

Forms Tractor, G. B. Bonner, IBM Technical Disclosure Bulletin, vol. 20, No. 4, Sep. 1977.

*Primary Examiner*—Allen N. Knowles

*Attorney, Agent, or Firm*—Cushman, Darby & Cushman

[57] ABSTRACT

Transport device for transporting a foil-like data recording strip of material having perforations along its borders for receiving pins disposed in endless transport belts entained about sprocket wheels. The belt pins have respective recesses which are engaged by the sprockets of at least a driving sprocket wheel in a form-fitting manner with the engagement being at a level which is at least at if not beyond the outer surface of the transport belt.

14 Claims, 14 Drawing Figures

Figure 1:
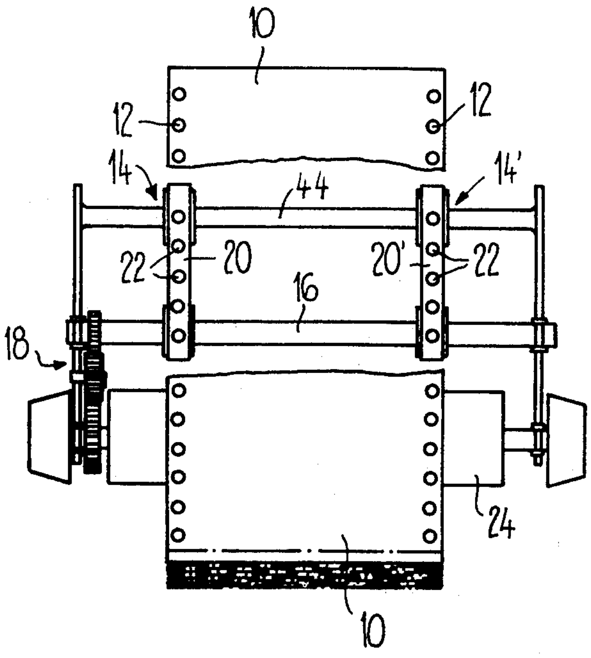

Fig. 3
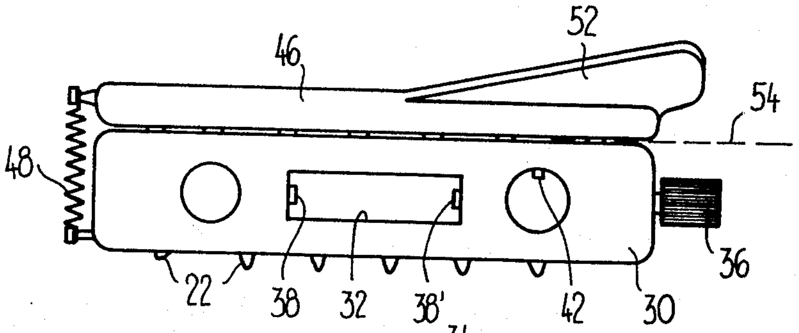
Fig. 4
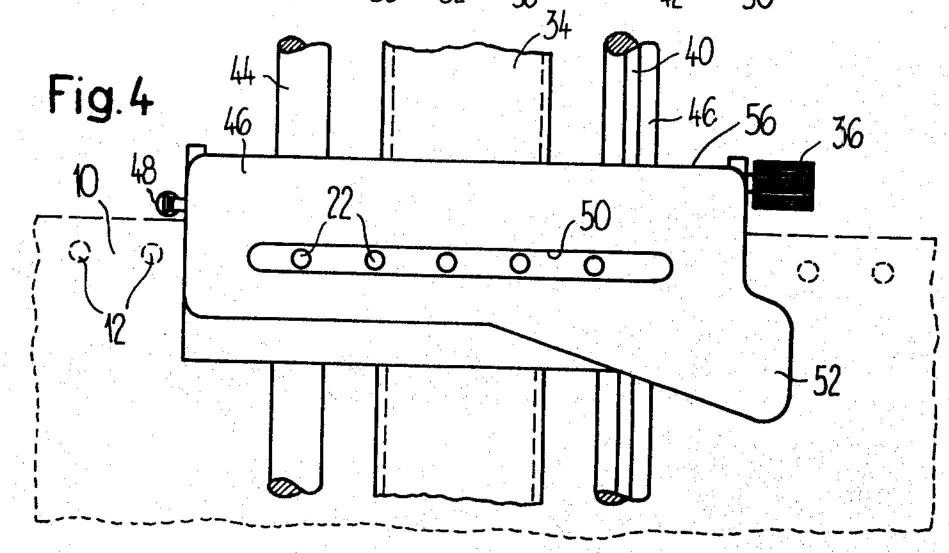
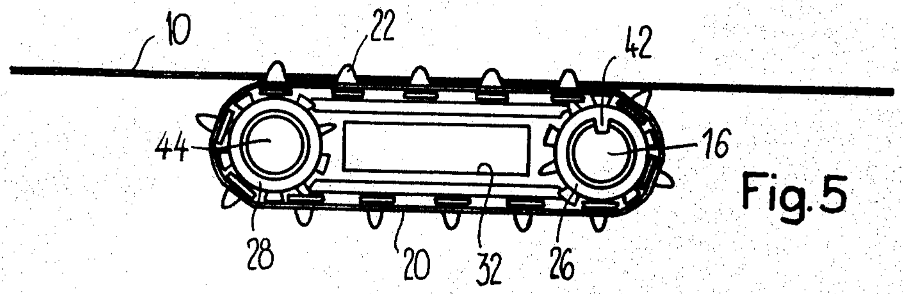
Fig. 5

TRANSPORT DEVICE FOR A BORDER-PERFORATED STRIP-LIKE WEB OF DATA RECORDING MATERIAL

This invention concerns a transport device for a border-perforated strip-like web of data recording material, with an endless transport belt which carries teeth or pins that engage the border perforations, and with at least one drive sprocket wheel in form-fitting engagement with the transport belt.

This type of transport device can be built into, for example, a printer of a data processing device or in a registering instrument. In a transport device of the specified type, the transport belt is usually guided over two turnaround elements or wheels of which one is a driver. The data recording material usually lies on a portion of the transport belt between those wheels and is held down against the transport belt by a hinged guide member. Depending upon the length of this portion, a greater or lesser number of pins or "teeth" simultaneously engage the perforations, so that the force applied by the pins on those perforations or holes which are engaged, is distributed. The perforations of the data recording material, which is often made of thin paper, are thereby prevented from ripping under stress caused by advanced friction. Wider strips of data recording material are normally perforated on both sides, so that a transport device is arranged on each side of the data recording material as mirror images of each other, each being driven parallel to the other.

A transport device is known, in which the transport belt, the teeth or pins and the projections designed to engage the drive gear or wheel are made in one piece out of the same material. For this type of transport belt, similar to a drive belt, to be capable of being driven around the wheels at each end, it must be made of a rubber-like elastic material. Because of the stretchability of this type of material, however, a precision such as is necessary for line by line advancement, as in a line printer, is hardly capable of being achieved. If the thickness of this type of transport belt is increased, the frictional resistance increases also so that no improvement in this type is realizable.

It is also known to produce a transport belt out of a thin foil-like material and to set the teeth and the projections to engage the belt and drive gear. This type of material flexes easily, and also has a very small degree of stretchability, so that its advantages over a rubber-like elastic material are clear.

Among known transport belts using foil-like material, one has a tooth on the upper or outer side and a projection on the other side which are arranged to alternate longitudinally along the belt. The disadvantage of this arrangement is that because of the close proximity of the teeth and projections, the flexibility of the belt is inhibited, the cost of production of attaching these elements to the belt is correspondingly high and because of possible rivet heads used to attach the projections, the smooth top surface of the belt is disturbed as a support surface for the data recording material.

In one known variation of a transport belt, in place of projections, holes are arranged in the belt for form-fitting engagement with the drive gear on the sides or edges of the belt next to the teeth. In such an arrangement the belt must be correspondingly wide, so that the holes lie next to the edge of the strip of data recording material. This requires in addition a correspondingly wide embodiment of the turnaround elements and uses more space. With a transport belt of foil-like material there is also the danger that the holes will become enlarged in the direction of advancement by the stress placed on them, causing a loss of the desired precision.

Finally, a variation has also become known, for example as in Hubbard U.S. Pat. No. 3,825,162, in which a projection and a tooth are formed in one piece and set into a belt of foil-like material, so that the projection and the tooth lie opposite each other on the two sides of the belt. As the projections engage in recesses of the drive gear a frictional resistance is produced by means of which the transport belt is pushed radially away from the drive gear as the drive gear approaches the point of engagement. In addition, the easily flexible transport belt can become tilted or slightly twisted, because the radius in which the drive gear engages the projection is smaller than the radius in which the teeth carry the data recording material. By means of the outwardly twisted or tilted transport belt, the data recording material is pressed against the guide member. The corresponding additional friction causes an increased load on the drive of the transport device and also a greater stress on the data recording material.

The guide member that holds down the data recording material is usually a cover, which in its closed position lies relatively close to and over the plane of the data recording material. The accessibility of this cover for manual opening is therefore made more difficult, and there is the danger that the contact will damage the data recording material. This cover should therefore be formed in such a manner that it is easily accessible for manual opening.

The basic purpose of the invention is to create a transport device of the above-mentioned type, in which the friction between the drive gear and the transport belt is reduced to a minimum, and with which drive gear exerts no or only very minor radial forces on the transport belt. In addition, the transport device will be of the simplest possible construction while maintaining high advancement precision.

The solution to the purpose set forth is accomplished according to the invention in that the drive gear is occupied by sprockets, which engage in recesses formed in the teeth of the transport belt.

By means of the engagement of the sprockets in the teeth, the transferred force is exerted on the same side of the transport belt on which the teeth carry the record support. In this manner a twisting of the teeth in a peripheral direction during the engagement of the sprockets is practically impossible.

Figure 2:
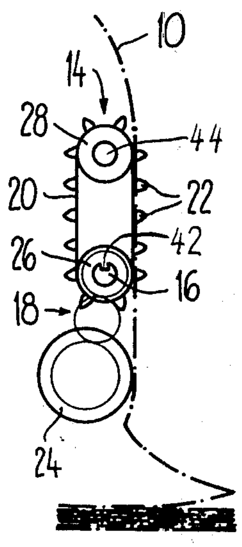
Figure 6:
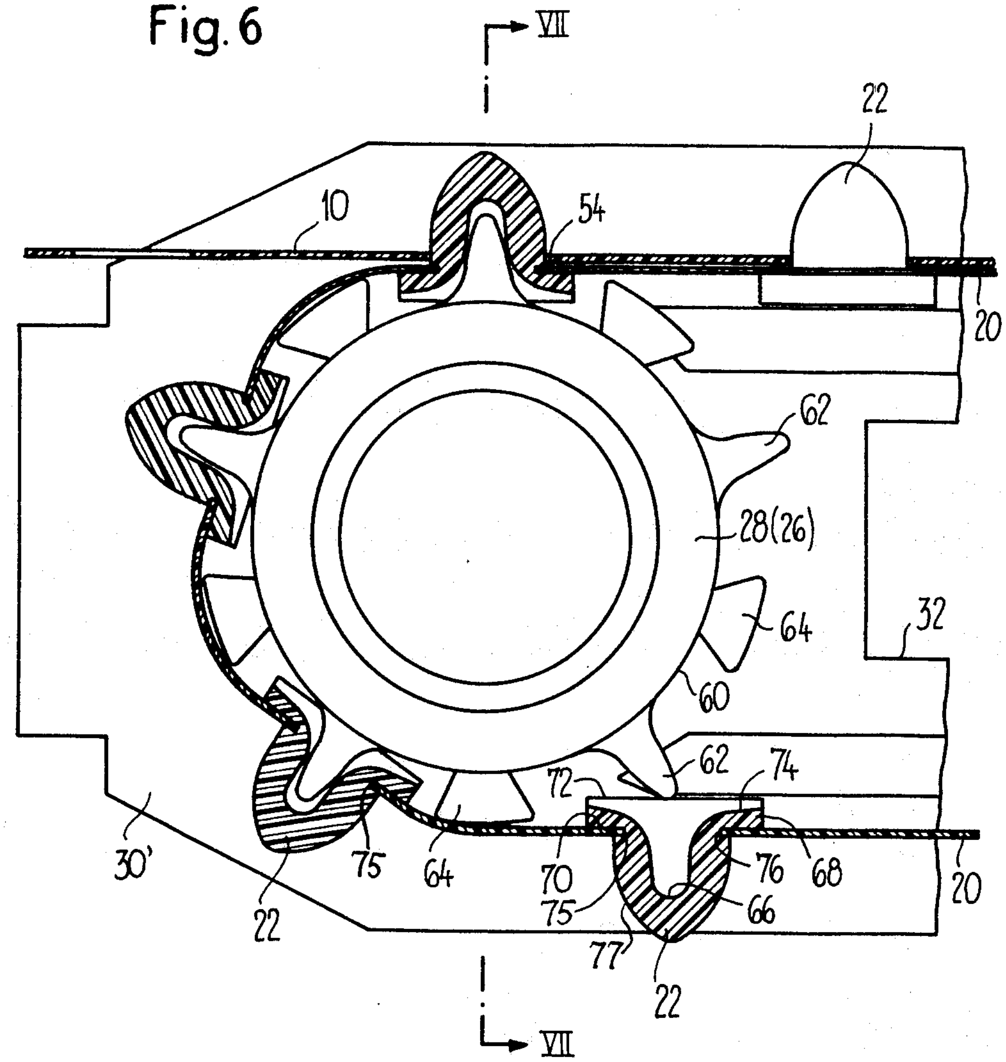
Figure 7:
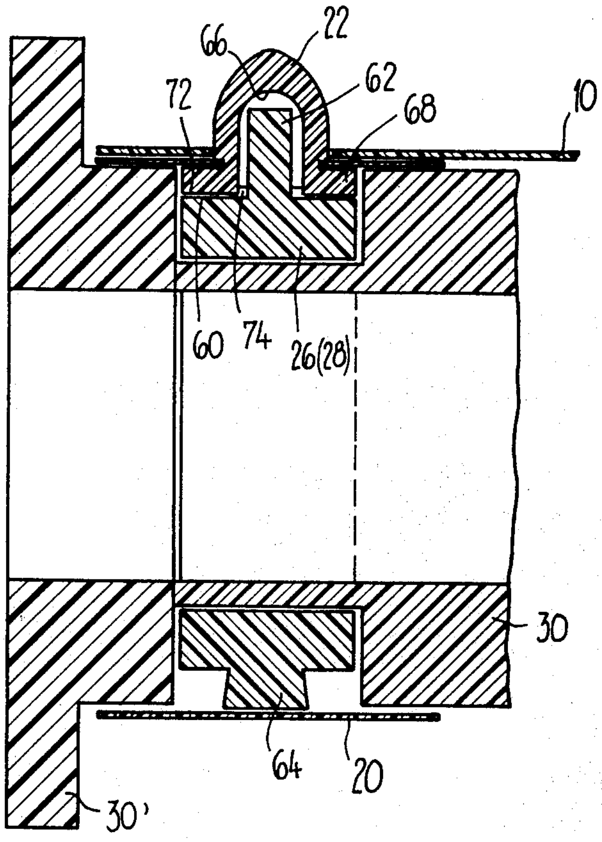
Figure 8:
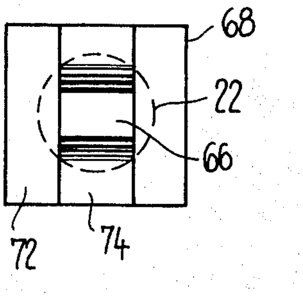
Figure 9:
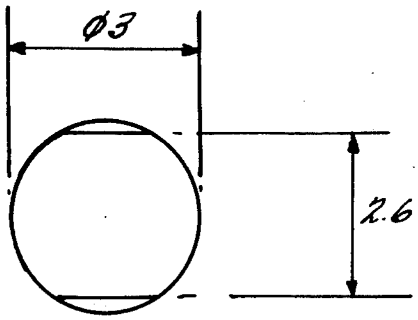
Figure 10:
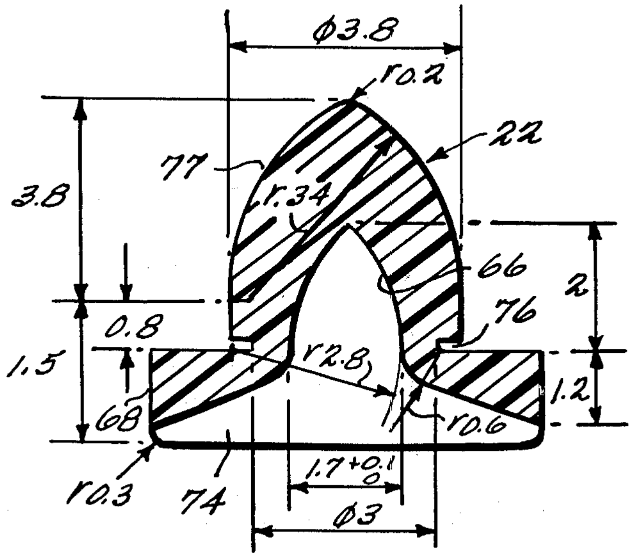
Figure 11:
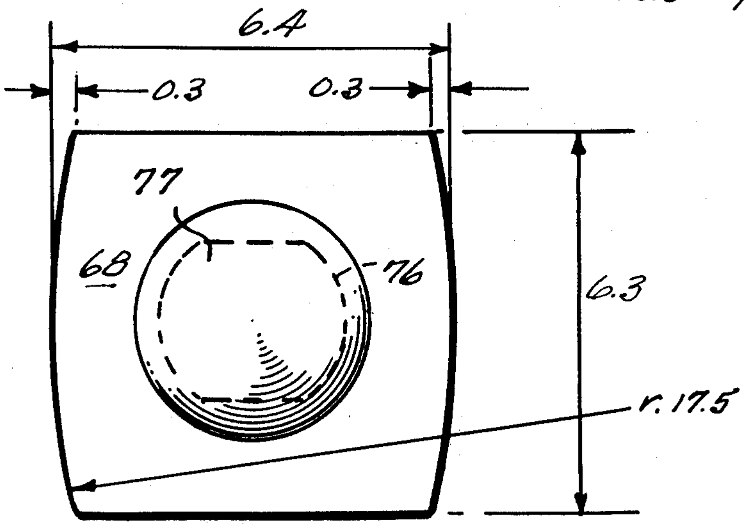
Figure 12:
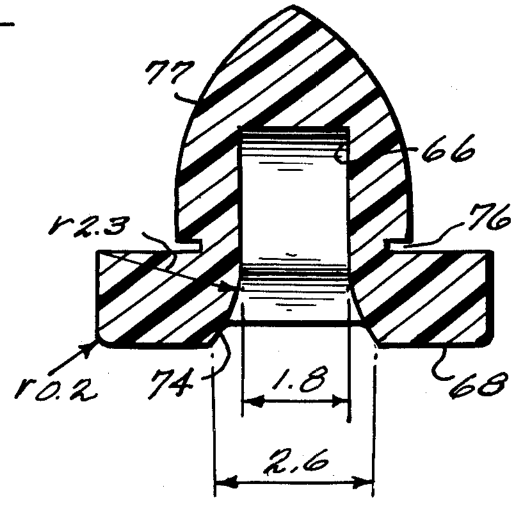
Figure 13:
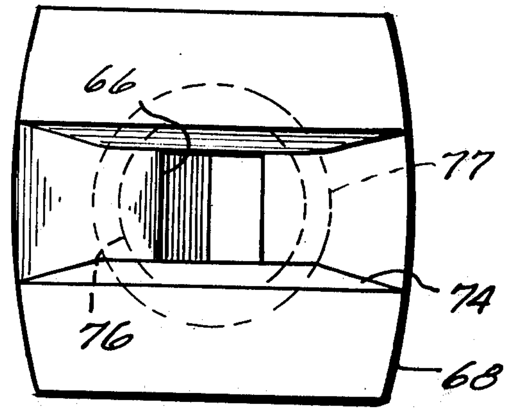
Figure 14:
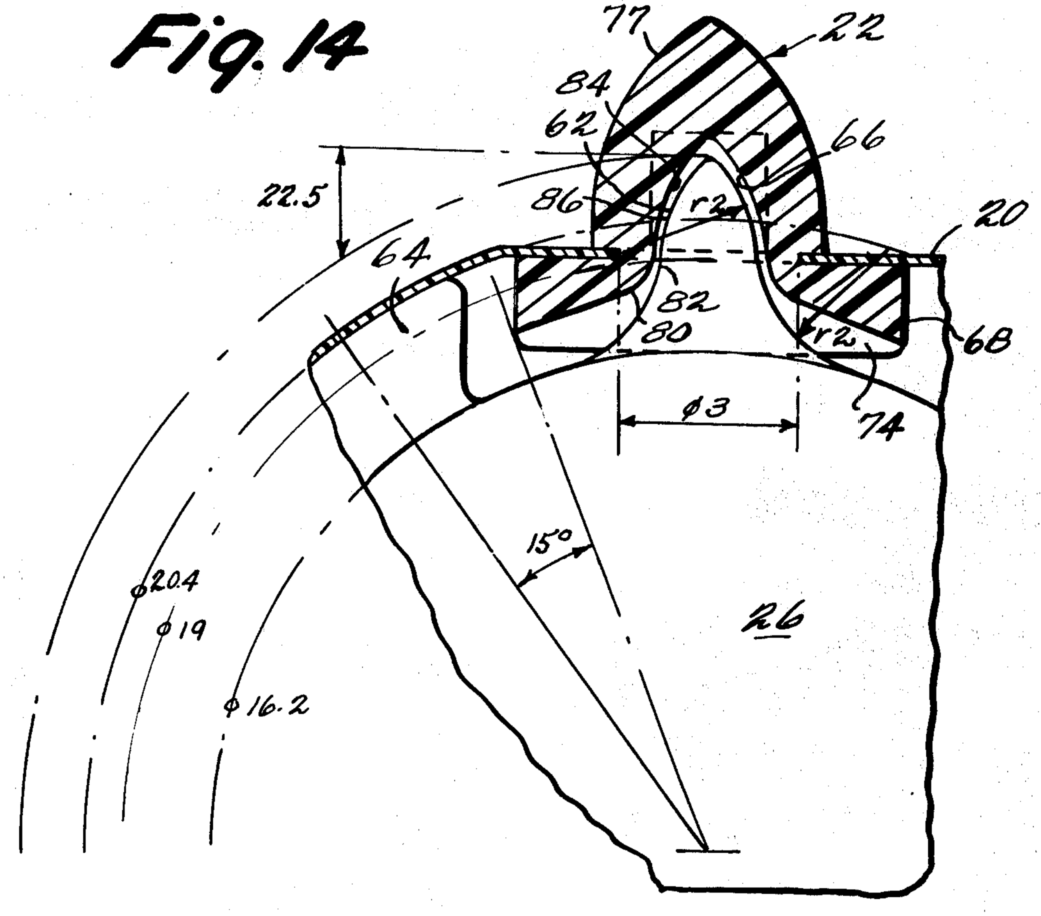

With the aid of the drawings an exemplary embodiment of the object of the invention is described in more detail. Shown are:

FIG. 1: a schematic view of an arrangement with two transport devices in top view and a strip-like web of data recording material, FIG. 2: a side view according to FIG. 1, FIG. 3: a side view of a closed transport device with a hinged guide member, FIG. 4: a top view according to FIG. 3, FIG. 5: an endless transport belt arranged on drive gears, FIG. 6: an enlarged partial view according to FIG. 5 in section through the sprockets and the transport belt, FIG. 7: a sectional view according to FIG. 6, FIG. 8: a transport tooth with a rectangular foot from the bottom side, FIG. 9: shows the shape of a preferred hole in the transport belt for receiving pins, FIG. 10: is a cross sectional view of a preferred pin, FIG. 11: is a top plan view of the pin in FIG. 10, FIG. 12: is a transverse cross sectional view of the FIG. 10 pin, FIG. 13: is a bottom view of the FIG. 10 pin, and FIG. 14: is a partial side elevation view of a drive sprocket wheel engaging a pin shown in cross section.

FIG. 1 shows a strip-like web of data recording material 10 having perforations or holes 12 at predetermined longitudinal spacings on both of its outer edges or side borders. A transport device 14,14′ is arranged on each side, the data recording material 10 being interrupted to display these transport devices. Both transport devices 14,14′ are driven by a common shaft 16 which in turn is driven by a transmission 18 and a drive as shown in FIG. 1. Each of the transport devices 14,14′ has a respective endless transport belt 20,20′, which is made from a foil-like material. These transport belts contain teeth or pins 22 disposed in the belts at proper spacings to engage holes 12 of the data recording material 10. The data recording material 10 can be printed upon or written upon with a drum 24 as support.

In the schematic side view according to FIG. 2, it will be noted that the transport belt 20 is guided by two wheels or turnaround elements 26,28. As later apparent, both of these wheels are of the sprocket type, with sprocket wheel 26 being rigidly connected to the drive shaft 16 so as to operate as a drive wheel or gear with its sprockets standing in form-fitting engagement with the pins 22 of the transport belt 20.

In FIGS. 3 and 4, the transport device is shown in its closed condition. The housing 30 has a rectangular opening 32 which lies parallel to the plane of the data recording material 10. This rectangular opening 32 is adapted to receive a rectangular bar 34 on which the device can be mounted. A knurled-head screw 36 operates clamping jaws 38,38′, which project into opening 32. Tightening screw 36 allows the transport device to be firmly tightened onto rectangular bar 34. The previously mentioned drive shaft 16 includes a keyway spline 40 which is engaged by a feather key 42 of the drive gear 26 (see FIG. 5). The second sprocket wheel 28, which is identical to the drive wheel 26 minus the feather key, is associated with a guide shaft 44.

A cover 46 is arranged on the housing 30 as a hinged guide member for the data recording material 10. The cover 46 is held in its closed position by a drawer spring 48 in order to hold the data recording material with its holes 12 on the pins 22 without clamping. In the area of pins 22, the cover 46 has a slit 50 into which pins 22 may protrude. In order to manually open the cover 46 more readily, a wing-like projection is provided, and as shown is arranged opposite the driven side 56. This projection is upwardly inclined as to the transport plane 54 of the data recording material and extends diagonally out over a corner. On the lower side as seen in FIG. 3, a second such cover can be arranged on the housing 30 to mirror the first cover when the lower side is also to be used to transport a strip of data recording material.

The form-fitting engagement of the drive wheel or gear 26, which serves as the turnaround element for transport belt 20, is illustrated in FIG. 5, and is now explained in more detail with the aid of FIG. 6. While the sprocket wheel in FIG. 6 is mainly designated by the numeral 28, it is to be understood as above indicated that the driving sprocket wheel 26 is exactly the same as the FIG. 6 illustration except that the drive wheel arrangement would include a keyway 40 and key 42 as shown in FIGS. 4 and 5.

As noted in FIG. 6, gear 28 has a smooth cylindrical peripheral surface 60 from which upstands sprockets 62 and support members 64 disposed alternately about the periphery 60. Sprockets 62 engage in recesses formed in pins 22 of the transport belt 20. Supporting members 64 serve to support the transport belt 20 in the areas between successive pins 22.

The pins 22, or "teeth" as they are sometimes called, are round in cross section and have a rectangular base 68 as shown in FIG. 8. Each pin 22 is secured in a hole of the transport belt 20 in such a manner (as described below) that the upper or outer side 70 (FIG. 6) of the base 68 lies on the transport belt 20. The lower or inner side 72 of base 68 is basically smooth and lies against the cylindrical peripheral surface 60 of the transport sprocket wheel during engagement of the respective sprocket 62 in a recess 66. The sprockets 62 show a radially tapering rectangular cross section. Recesses 66 in pins 22 are also rectangular in cross section. In order to guarantee a failure-free engagement of the sprockets 62 into recesses 66, a groove 74 is arranged on the lower or inner side 72 of base 68. This groove 74 extends in the direction of the belt from opposite sides of base 68, merging into recess 66 with the same width but with increasing depth. Sprockets 62 engage in the recesses 66 at least at the depth of transport plane 54, i.e., the outer surface level of data recording material 10. In this manner, any twisting or tilting of a sprocket 22 in a peripheral direction is impossible.

Next to the upper or outer side 70 of its base 68, each pin 22 has an annular groove 76 by means of which the pin is attached to belt 20. The holes 75 in the belt 20 are symmetrical with respect to both their longitudinal and transverse center lines but are not completely round so that the pins 22 are secured against rotation. FIG. 9 shows a preferred configuration of the holes 75 in belt 20, i.e., a circular hole except for diametrically opposed segments which form chords extending parallel to the longitudinal direction of belt 20. The annular groove 76 in pins 22 is of similar configuration to holes 75, and consequently the pins are prevented from rotating in the holes. Pins 22 have a nose portion 77 on the outer side of annular groove 76, and the pins are secured to belt 20 by pushing them into holes 75 with proper orientation, until belt 20 is disposed in groove 76 with the outer side 70 of the base portion 68 being against the inner surface of belt 20.

In FIG. 7, in which the outer half of housing 30 is designated 30′, it can be seen that base 68 of pin 22 is equally as wide as the drive wheel 26. The recess 66 in pin 22 is deeper than the length of sprocket 62 so that the sprocket does not reach the end of the recess. It is thus guaranteed that the pin 22 lies with its smooth underside 72 of base 68 tangential to the cylindrical peripheral surface 60 of the driving wheel 26. The same is true for sprocket wheel 28. In this manner pins 22 are prevented from tilting to the side.

FIG. 8 shows a pin 22 from its lower side 72 of its base 68. The groove 74 extending beyond the recess 66 to opposite sides of base 68 can be seen in this illustration. Base 68 in this exemplary embodiment is shown quadratic, but can instead be formed with any other cross sectional configuration especially of the substantially rectangular type. A preferred form of a complete pin 22 is illustrated in FIGS. 10–13, from which it is apparent that two of the opposite base sides are arcuate while the other two are rectilinear.

The entire embodiment of the drive wheel 26 described above, and pins 22 together with the use of a transport belt 20 of a nonstretchable foil-like material produces a precise guiding of the data recording material with very little friction between the drive wheel and transport belt, which stand in form-fitting engagement. The form of sprockets 62 and that of recesses 66 is such that during engagement of the sprockets in the recesses, the most ideal possible rolling motion results with very little friction. FIG. 14 shows a preferred form of sprockets 62 in relation to recess 66 of the preferred form of pin 22 as detailed in FIGS. 10–13. In FIG. 14 though sprocket 62 is shown centrally disposed in recess 66, in a driving situation a side wall of the sprocket would of course be against the corresponding side wall of the recess. The corresponding side walls of sprockets 62 and recesses 66 are approximate involutes in order to obtain smooth engagement and disengagement. Sprocket 62, as it enters groove 74 and recess 66 during the progression of the mating of the sprocket with the recess makes initial contact with the rounded corner 80 of groove 74 just below belt 20 and then gradually rolls into wider contact with the recess wall, i.e., approximately from point 82 to point 84 for counterclockwise movement, as the sprocket wheel turns and drives the pin and belt around a semicircle. The main driving point of sprocket 62 in FIG. 14 lies slightly above belt 20 in the region of the radius of belt 20 during its semicircular travel about the sprocket wheel, i.e., at approximately point 86. At the same time, as just explained, the contact area between sprocket 62 and recess 66 in FIG. 14 is more than just that main driving point, and this is in order to reduce wear, though as previously indicated there is very little friction between the two which are substantially stationary during their semicircular travel and substantially roll in and out of engagement and disengagement at opposite ends of that semicircular travel.

From the foregoing, it is apparent that only a minimum of constituent parts is necessary for the arrangement according to this invention. Hence, despite the increased demands for a precise and even transport of the data recording material, production costs can be held comparatively low.

What is claimed is:

1. In a transport device for transporting a strip-like web of data recording material having perforations and including an endless transport belt having projecting pins for engaging said perforations and being trained around two wheels at least one of which is a drive wheel, the improvement comprising:

said drive wheel having a plurality of sprockets, and each said pin having a recess for driving engagement by a said sprocket, said sprockets and recesses being configured relative to each other to effect a substantially frictionless relative rolling motion as between any said sprocket and recess at least as they engage and disengage.

2. Apparatus as in claim 1 wherein said web and belt define a transport plane between them and said sprockets and said pin recesses are so relatively disposed and configured as to cause any said recess to be fully engaged by a said sprocket at at least a recess depth that lies in the area of the transport plane of said web by said belt.

3. In a transport device for transporting a strip-like web of data recording material having perforations at predetermined spacings along the length of said web, the improvement comprising:

two spaced apart rotatable sprocket wheels at least one of which is a drive wheel and both of which have a plurality of sprockets spaced at said predetermined spacings and a smooth peripheral surface at least adjacent said sprockets, an endless web transport belt having inside and outside surfaces and being lengthwise disposed about said sprocket wheels with said inside surface facing said sprockets, said belt having apertures spaced along its length at said predetermined spacings and having respective pins nonrotatably secured in said apertures transversely of said belt, each of said pins having a nose portion projecting outwardly from said outside surface for engaging said perforations to transport said web and a base portion disposed on the inside surface of said belt, each of said pins further having a recess extending through said base portion and into said nose portion for receiving a said sprocket, said sprockets and recesses having predetermined configurations for causing form-fitting engagement between at least the drive wheel sprockets and recesses, said base portion of each pin having an inwardly disposed bottom at least part of which lies tangentially on a said smooth peripheral sprocket wheel surface adjacent a said sprocket, at least after that sprocket becomes initially inserted into a recess during rotation of said sprocket wheels, for preventing tilt or twist of said pins.

4. A device as in claim 3 wherein each of said belt apertures has longitudinal and transverse central axes one of which is longer than the other and each aperture is symmetrical about each of its said central axes.

5. A device as in claim 3 or 4 wherein each of said pins has between said nose and base portions an annular groove with a inward configuration substantially matching that of its respective aperture in said belt for receiving said belt for securing each pin nonrotatably in its respective belt aperture.

6. A device as in claim 3 wherein each of said sprocket wheels has a plurality of belt supporting members projecting outwardly respectively between adjacent sprockets for preventing belt slack between successive sprockets.

7. A device as in claim 6 wherein said belt supporting members extend from a circumference containing said smooth peripheral surface radially outward a distance greater than said pin base portions extend inwardly from the inside surface of said belt for tensioning the belt between sprocket engaged pins.

8. A device as in claim 3, 4, 6 or 7 wherein said transport belt is a foil-like material.

9. A device as in claim 3, 4, 6 or 7 wherein each said pin base portion has in its said bottom a groove which extends beyond the base recess in the longitudinal direction of said belt and which is equally as wide as and merges into that recess.

10. A device as in claim 9 wherein said groove has opposite longitudinal ends of predetermined depth and its depth increases near its said merger with said recess.

11. A device as in claim 9 wherein said sprockets of at least said drive wheel have a rectangular cross section tapering in the outward radial direction and the recess in at least the nose portion of each of said pins has a rectangular cross section tapering in the outward direction of said pin.

12. A device as in claim 11 wherein the said sprocket and recess taperings have respective curvatures causing substantially only a rolling motion between an engaged sprocket and recess in at least said drive wheel.

13. A device as in claim 3, 4, 6 or 7 including a housing about said sprocket wheels and transport belt, said housing having a cover member hinged on one longitudinal side and an inclined wing-like handle on its opposite side for opening and closing the cover member which in its closed position is disposed to hold said web of data recording material adjacent said transport belt with the pins of the latter protruding through said web perforations.

14. A device as in claim 13 wherein said handle extends diagonally from a corner of said cover member.

* * * * *

UNITED STATES PATENT AND TRADEMARK OFFICE
CERTIFICATE OF CORRECTION

PATENT NO. : 4,193,527

DATED : March 18, 1980

INVENTOR(S) : Albert RUTISHAUSER

It is certified that error appears in the above—identified patent and that said Letters Patent is hereby corrected as shown below:

In the heading:

The patent should be read as containing the following information:

[76] Inventor: Albert RUTISHAUSER, Rutihofstrasse 40, 8713 Uerikon, Switzerland

Signed and Sealed this

*Twenty-eighth* Day of *October 1980*

[SEAL]

*Attest:*

SIDNEY A. DIAMOND

*Attesting Officer* *Commissioner of Patents and Trademarks*